United States Patent
Schmitt-Walter

(10) Patent No.: US 7,420,137 B2
(45) Date of Patent: Sep. 2, 2008

(54) METHOD OF OPEN AND/OR CLOSED-LOOP CONTROL OF THE MOVEMENT OF WELDING TONGS

(75) Inventor: Stefan Schmitt-Walter, Oberhaching (DE)

(73) Assignee: SWAC Electronic GmbH, Zug (CH)

( * ) Notice: Subject to any disclaimer, the term of this patent is extended or adjusted under 35 U.S.C. 154(b) by 0 days.

(21) Appl. No.: 10/563,534

(22) PCT Filed: Jun. 2, 2004

(86) PCT No.: PCT/EP2004/005934

§ 371 (c)(1), (2), (4) Date: Apr. 25, 2006

(87) PCT Pub. No.: WO2004/113011

PCT Pub. Date: Dec. 29, 2004

(65) Prior Publication Data

US 2006/0243706 A1  Nov. 2, 2006

(30) Foreign Application Priority Data

Jun. 25, 2003 (DE) ................ 103 28 593

(51) Int. Cl.
*B23K 11/11* (2006.01)
(52) U.S. Cl. .................. 219/86.7; 219/90
(58) Field of Classification Search ......... 219/86.32, 219/86.33, 86.41, 86.51, 86.7, 86.61, 90
See application file for complete search history.

(56) References Cited

U.S. PATENT DOCUMENTS 5,091,623 A * 2/1992 Obara et al. ............ 219/89
5,528,011 A * 6/1996 Kono et al. ............ 219/86.41
5,988,486 A * 11/1999 Kobayashi et al. ......... 228/212

FOREIGN PATENT DOCUMENTS

| DE | 29 15 442 | 10/1980 |
|----|-----------|---------|
| DE | 36 12 502 | 10/1987 |
| DE | 201 073 28.5 | 4/2001 |

OTHER PUBLICATIONS

International Search Report dated Nov. 12, 2004 in PCT International Appln. No. PCT/EP2004/005934 (4 pages).

* cited by examiner

*Primary Examiner*—Kevin P. Kerns
(74) *Attorney, Agent, or Firm*—Flynn, Thiel, Boutell & Tanis, P.C.

(57) ABSTRACT

A method for open or closed-loop control of welding tong movement utilizes a welding tong drive having a primary and a secondary drive device. The primary drive device moves two welding tong limbs with welding electrodes toward a welding object from opposite sides. The welding tong limbs press onto the welding object with a predetermined compressive force. During actuation, the secondary drive device varies a spatial orientation of the welding tongs. In order to contact the welding object in a controlled manner, and to reliably acquire any deviations from specified spatial points during contacting, the welding tongs first approach a spatial point relative to the welding object. The welding tong limbs are held in a fixed spatial orientation during the approach. The secondary drive device is actuated until a welding tong limb contacts the welding object. The primary drive device then closes the welding tong limbs.

11 Claims, 1 Drawing Sheet

METHOD OF OPEN AND/OR CLOSED-LOOP CONTROL OF THE MOVEMENT OF WELDING TONGS

BACKGROUND OF THE INVENTION

1. Field of the Invention

The invention relates to a method for the open and/or closed-loop control of the movement of welding tongs by a welding-tong drive, which comprises at least one primary and one secondary drive device. The primary drive device moves at least two welding tong limbs with welding electrodes from essentially opposite sides towards a welding object and presses them with a predetermined contact pressure onto the object. Actuation of the secondary drive device determines a spatial orientation of the welding tongs.

2. Description of Related Art

Welding tongs are, for example, used in the production of cars to weld together metal panels as welding objects. Generally, such welding tongs comprise two welding tong limbs, which are arranged in a C or X shape. By actuating a primary drive device, the welding tong limbs are brought closer together and are finally pressed onto different sides of the welding object. The actual welding can occur spot-shaped by resistance-welding, laser-beam welding, arc welding or a similar technique.

For the welding tongs a secondary drive device is furthermore provided, through which, for example, the so-called tong compensation occurs. This prevents an unintentional change of the spatial axis of the welding tongs during movements of the complete welding device.

In addition, the secondary drive device is also used to compensate the forces arising during closure of the welding tongs and contacting of the welding object.

With previously known methods, generally a rigid welding tong limb is released or brought further towards the welding object by linear movement using air or electric motors to compensate for the forces. However, this occurs due to an uncontrolled movement of the rigid welding tong limb. For example, the contacting of the welding object by the rigid welding tong limb cannot be acquired, and in particular accurate spatial orientations of the welding object with respect to the welding tongs cannot therefore be acquired. This leads to an uncertainty during welding which conflicts with increasing quality demands for each weld.

The object of the invention is to improve a method of open and/or closed-loop control of welding tong movement such that the contacting of the welding object occurs controlled through the welding tongs and any deviations from the specified spatial points during contacting are reliably acquired.

BRIEF SUMMARY OF THE INVENTION

According to the invention the approach of the welding tongs occurs at a certain spatial point. This is, for example, specified by an appropriate welding point on the welding object. During the approach, the welding tongs are held in a fixed spatial orientation, whereby this spatial orientation relative to the spatial point to be approached is similarly acquired. Once the spatial point is reached, at least one tong limb is moved by the secondary drive device until it contacts the welding object. In doing this, not only the contacting itself is acquired, but rather also the corresponding contact location via the movement of the secondary drive device, the aforementioned fixed spatial orientation and the specific spatial point. Depending on the acquired contact point, a correction of, for example, the spatial orientation of the welding tongs can take place, so that then a reliable closure of the welding tong limbs is possible by the primary drive device with the establishment of a suitable welding pressure and thus the welding fulfils all the quality requirements.

Since contacting by the secondary drive device can be precisely acquired, there is no bouncing of the welding tong limb relative to the welding object, through which damage to the welding object could occur or through which at least the noise level is increased. In addition, panel deformation due to non-uniform welding pressure can be prevented. There is also even the possibility of acquiring the thickness of the welding object, and in particular of carrying out detection of the panel thickness at the moment of contacting and during closure of the welding tongs.

According to the invention, meeting or contacting the welding object can be acquired, whereby the contacting occurs at an angle to the perpendicular at the contact point, i.e. when the corresponding welding electrode approach is not exactly vertical relative to the welding point.

The welding tongs can, according to the invention, be moved relative to the welding object to the specific spatial point by normal movement devices. Such movement devices are suitable automatic handling devices or similar devices, for example, robot devices. After appropriate programming, such a robot device moves the welding tongs up for welding at each of the spatial points.

In order to be able to carry out the movement or the displacement of the primary and secondary drive devices, particularly controlled, in a simple way, the primary and/or secondary drive device can be operated by electric motors. An example in this connection is a servomotor with appropriate gears for converting a rotational movement into a translational one, such as circulating ball spindles or similar devices.

In order to be able to favourably hold the welding tongs in the fixed spatial orientation during the approach and to simultaneously obtain information about the spatial orientation, the secondary drive device can be supplied with current varying in level and direction. Consequently, for example by means of the robot device, the rigid spatial orientation or the relative position to the robot device or also to the welding object is retained during the movement of the welding tongs. Simultaneously, information about the spatial orientation is provided by the level and direction of the current.

After termination of the approach, but before contacting the welding object with at least one welding tong limb, the applied holding current of the secondary drive device can be acquired with arithmetical sign. Here it must be noted that a certain holding current of the secondary drive device, which has a positive or negative arithmetic sign depending on the resulting force vector (compression or tension), always corresponds to a specific spatial point. Here, it should also be noted that the holding current can furthermore depend on the welding tongs used.

An appropriate holding current also arises for the primary drive device, whereby this holding current however is not important for the position of the welding tongs in space or for the spatial point approached.

Due to the relationship between the holding current and the spatial point, it is possible advantageously to vary the holding current by a specific contacting current value, so that a further approach of the welding tongs to the welding object and the specific spatial point can occur by means of the secondary drive device for setting the welding point. This approach occurs up to the acquisition of the contact by at least one of the welding tong limbs.

Since the contacting current value can be dependent on the respective spatial point and the spatial orientation of the welding tongs, the contacting current value can be advantageously experimentally determined for essentially each spatial point. However, there is also the possibility that one certain predetermined contacting current value is used for all spatial points and spatial orientations.

Since the frictional forces occurring in the secondary drive device can be different depending on the spatial point and spatial orientation of the welding tongs, the appropriate contacting current value is selected at least so large that it can overcome the frictional forces (initiation of movement) in dependence of the spatial point, spatial orientation and the respectively used welding tongs.

In this connection, it can be shown to be advantageous if optionally the contacting current value is increased briefly by a predetermined factor to attain an initial breakaway torque for initiating the movement of the welding tongs by means of the secondary drive device. This is used, for example, for overcoming the stick-slip effect for initiating the movement in corresponding welding tong orientations.

There is here the possibility that the initial breakaway torque is similarly dependent on the welding tongs used, on the spatial point or the spatial orientation of the welding tongs and according to the invention, for example, can be controlled such that the contacting current value is only increased for a certain time and/or a certain movement displacement of the secondary drive device.

According to the invention, the closed-loop control of the movement of the secondary drive device here advantageously does not occur or at least does not occur only via a position determination, but rather via the determination of the current, whereby advantageously also the contacting of the at least one welding tong limb can occur by monitoring the current passed to the secondary drive device.

Since in this connection the movement by the secondary drive device essentially occurs through the low contacting current value, the contacting can occur softly and without mechanical deformation of the welding object. Here, it should be noted that the contacting current value generally lies in the milliampere range.

One simple method of acquiring the contacting by means of the current can be seen in that a so-called servo lag in the monitored current is found. This is generally produced by a difference between the actual position or orientation value and the corresponding set value for the secondary drive device.

After appropriate acquisition of the contacting and optionally alignment of the welding tongs relative to the welding object, complete closure of the welding tongs by the primary drive device can then take place and the welding pressure needed for spot-welding with sufficient quality can be applied. Normally, this amounts to a few kN and in particular up to about five kN.

According to the invention, opening of the welding tongs or a subsequent approach to a further welding point can be open and/or closed-loop controlled in an analogous manner. To do this, it is possible, for example, before approaching a further welding point or also after terminating welding, to open the welding tong limbs by means of the primary drive device and then to move the welding tongs by means of the secondary drive device to a specified starting spatial point. This starting spatial point can correspond to the fixed spatial orientation mentioned above during the approach to a corresponding welding point. After reaching this starting spatial point and with appropriate spatial orientation of the welding tongs then the next welding point can be approached, for example by the robot device, at which then contacting is monitored in the manner already described.

In order to always correctly approach appropriate spatial points automatically with the method according to the invention, deviations at specified spatial points of the welding object or of the corresponding welding point can be acquired by means of the open and/or closed-loop control device of the secondary drive device and/or of the primary drive device and passed to an evaluation device for quality assurance. Such a deviation from a specified spatial point can be acquired, for example, in a comparison between the contact point and the corresponding spatial point and where the contact point and spatial point do not match, a corresponding deviation is determined. This may arise, for example, due to incorrect spatial positioning of the welding object to be welded and/or due to the programmed position of the robot device.

Corresponding deviations may, however, also occur in that electrode wear has occurred. Such electrode wear arises with resistance welding, for example, when with galvanised steel sheet as the welding object, the formation of alloy between the melted zinc and copper of the welding electrodes occurs. Here, a deviation of the contact point to the associated spatial point arises due to the changes to the body of the welding electrode. This can be corrected according to the invention. Furthermore, it should be noted that the service life of the welding electrodes is increased, for example by electrode milling, through which this corresponding alloy formation is rectified, but in turn changes to the electrode body occur due to this electrode milling, which leads to a corresponding deviation of the contact point and spatial point; refer to the above explanations. Also, such a deviation can be acquired according to the invention and compensated.

The acquisition of such bodily changes occurs here according to the invention so accurately and attributable that the corresponding bodily changes of the respective electrode or of the respective welding tong limb can be attributed. Consequently, according to the invention there is the possibility that bodily changes to the welding electrodes or parts thereof due to wear, degrading of material, loss of a welding electrode or parts thereof or similar effects can be acquired on contacting the welding object or contacting the welding electrodes directly together.

According to the invention there is also the possibility that such bodily changes can be used for correction of the above mentioned starting spatial point and/or passed to the evaluation device. Such a transfer is similarly used for quality assurance and can, for example, be used through a suitable signal to an assigned station to initiate a cap replacement or cap milling.

Overall within the scope of quality assurance, the method according to the invention is used for quality inspection, quality monitoring and quality control.

If the welding tongs are for example supported on the robot device for swivelling about a swivel axis, the secondary drive device can comprise a drive which appropriately varies the swivel angle about this swivel axis. Here, the welding tongs are essentially only moved in one plane extending perpendicular to the swivel axis. However, it is also possible that two or more drives are used for the secondary drive device so that, with appropriate support of the welding tongs on the associated movement device, it can be swivelled essentially within a hemisphere.

It should be noted that, depending on the implementation of the drive devices and their arrangement and movement by appropriate movement devices, other parameters can be measured and modified, as well as in particular the current, to be able to find the spatial point and spatial orientation and optionally to change them, whereby this may be the actuation condition of the corresponding drives of the drive devices and/or positions of these drive devices.

Furthermore, it should be pointed out that the method according to the invention is not restricted to welding tongs for resistance welding, but rather can also be used with other thermal joining techniques or also mechanical joining techniques if exactly one contact point of the corresponding device and of the object to be processed is to be found. In addition, refer also to the previous explanations, according to the invention, apart from, for example, panel thickness detection during the welding of panels or other distance measurements of the corresponding welding tong limb through measurement of the current, a force profile for the closure of the welding tongs and during welding can be determined.

BRIEF DESCRIPTION OF THE DRAWING

The method according to the invention is explained in more detail based on the enclosed FIGURE.

DETAILED DESCRIPTION OF THE INVENTION

Figure 1:
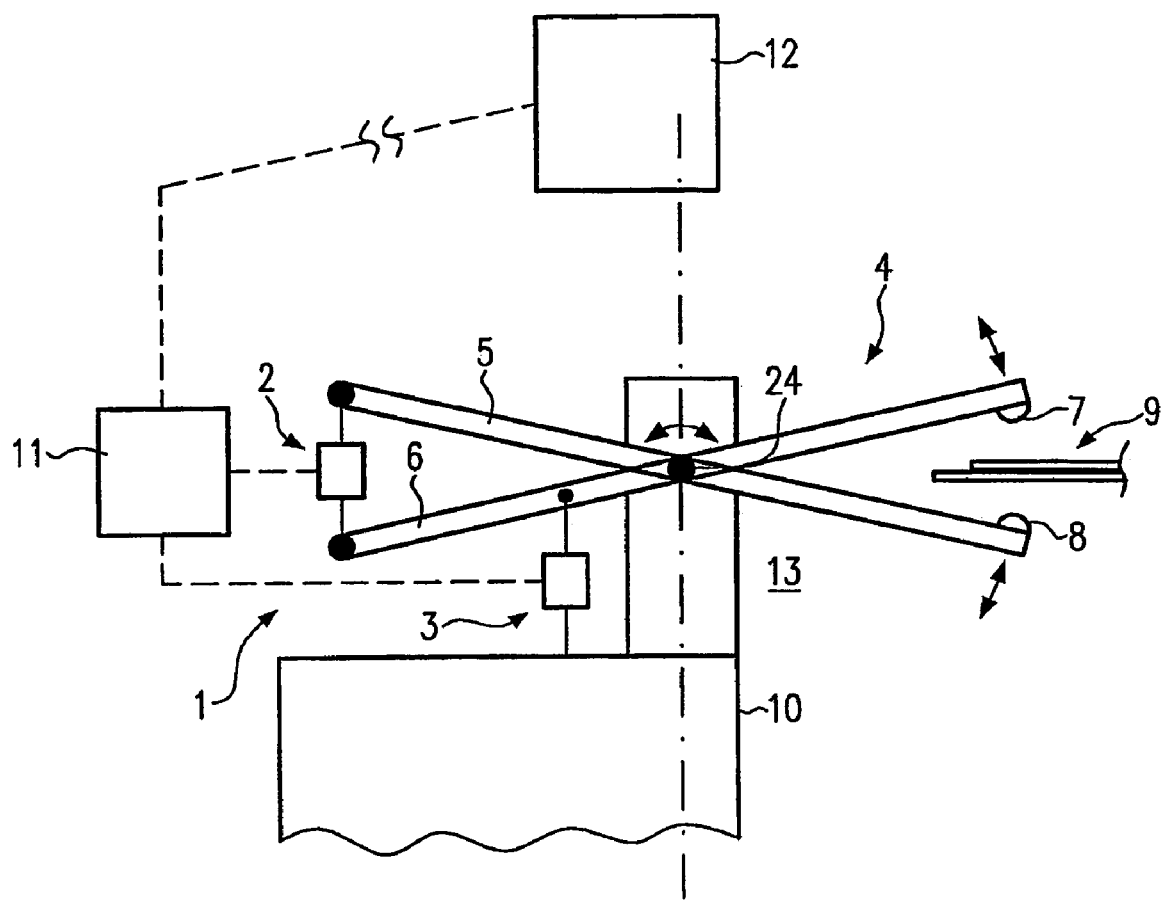
FIG. 1 shows a side view of welding tongs with the appropriate drive.

In FIG. 1, X-shaped welding tongs 4 with two welding tong limbs 5 and 6 are illustrated. The limbs 5, 6 can be swivelled about a swivel axis 24. The swivel axis 24 is configured on a robot device 10 as a movement device for the welding tongs 4. A secondary drive device 3 is assigned to the welding tongs 4 for swivelling about the swivel axis 24. A primary drive device 2 is arranged between welding tong limbs 5, 6 for swivelling them relative to one another.

The primary and secondary drive devices 2, 3 are, for example, formed by electric motor drives, such as for example servomotors, wherein the primary and secondary drive devices 2, 3 form a welding tong drive 1.

Appropriate welding electrodes 7, 8 are arranged on the ends of the welding tong limbs 5, 6 opposite the primary drive device 2. These electrodes can be moved towards a welding object 9 in the form of, for example, two panels to be welded together by actuating the primary drive device 2 from the opposite ends.

Due to the secondary drive device 3, the welding tongs 4 can be rigidly arranged relative to the robot device 10, i.e. they can be fixed in their position or spatial orientation. Using the primary drive device 2, a movement of a welding tong limb 5 can be carried out in this respect, which can be moved relative to the welding tong limb 6 fixed by the secondary drive device 3.

For open and/or closed-loop control of the drive devices 2, 3 they are connected to an open/closed-loop control device 11. This device 11 carries out, for example, a measurement of the current in the drive devices in terms of level and arithmetic sign, acquisition of the speed of the corresponding drives of the drive devices as well as other parameters. In addition, transfer of the corresponding data to an optionally remotely situated evaluation device 12 occurs from the open/closed-loop control device 11. The transfer of the data can occur via a cable link or also wireless.

With a further embodiment of the welding tongs 4, the secondary drive device 3 can, for example, comprise two drives which not only swivel the welding tongs 4 in the plane of the FIGURE about the swivel axis 24, but rather swivel also perpendicular to the plane of the paper, so that the welding tongs 4 with the corresponding electrodes 7, 8 can be swivelled essentially in a hemisphere 13.

According to the invention, in particular three parameters of the welding tongs can be measured, whereby these are the current, speed and position. These three parameters are not only measured, but rather modified appropriately for the operation of the welding tongs. The welding tongs 4 are brought up to the welding object 9 by the robot device 10. During this approach, the secondary drive device 3 is open or closed-loop controlled such that the welding tongs 4 are arranged in a fixed spatial orientation. To achieve this, current of suitable level and direction is passed to the electric motor drive of the secondary drive device 3.

After the welding tongs 4 have been brought up to the welding object 9, the movement of the robot device 10 is interrupted so that with regard to this all axes, generally six or seven, exhibit the speed of zero. Here, the welding tongs 4 are in a certain predetermined spatial orientation and are arranged at a certain predetermined spatial point. This corresponds to a defined holding current of the secondary drive device, which depending on the resulting force vector—due to compression or tension—has a positive or negative arithmetic sign. This applies analogously also to the holding current of the primary drive device 2.

In order to bring together the welding tong limbs 5, 6 and to contact the welding object 9 with at least one welding electrode 7, 8, a contacting current value is additionally applied to the secondary drive device 3. This is determined relative to the holding current and is added vectorially to it.

To enable a movement of the welding tong limb or limbs 5, 6 to occur, the contacting current value is just so large that the appropriate frictional forces of the respectively used welding tongs 4 are overcome. The frictional forces can here be different for each spatial point, so that optionally different contacting current values are used depending on the spatial point.

To initiate the movement of the welding tong limb or limbs 5, 6, the contacting current value is briefly increased by a certain factor in order to achieve an adequate initial breakaway torque with regard to the so-called stick-slip effect. This increased contacting current value is passed for a certain time or also for a certain displacement to the secondary drive device 3.

Contacting of the welding object 9 by a welding electrode 7, 8 through appropriate actuation of the secondary drive device 3 is acquired by the open/closed-loop control device 11 by means of the passed current, and in particular due to the so-called servo lag. Since the contacting current value is only in the range of milliamperes, such detection occurs softly and without mechanical deformation of the welding object.

It should also be pointed out that the tong compensation occurs through the secondary drive device 3, i.e. a compensation of the forces occurs during the welding process with closed welding electrodes 7, 8 pressed onto the welding object 9.

The forces exerted during welding generally amount to a few kN and in particular up to 5 kN. Such forces are generally needed for reliable spot welding.

The build-up of the appropriate welding pressure occurs after the acquisition of contacting. Apart from acquiring contacting, analogously the thickness of the welding object or the distance of the welding electrodes 7, 8 can also be acquired.

Furthermore, the force trace can be acquired both during contacting as well as during welding by means of the primary and secondary drive devices 2, 3 and the associated open/closed-loop control device 11 and can be evaluated by the evaluation device 12 for quality assurance.

To approach a further welding point opening of the welding tongs, it is necessary to actuate the primary drive device 2 and then actuate the secondary drive device 3 so that the welding tongs 4 are arranged in a starting orientation and at a starting spatial point from where, for example, the first approach towards the welding object occurs.

The starting orientation or spatial orientation of the welding tongs 4 can be corrected with regard to certain changes. Such changes are, for example, wear of a welding electrode, loss of a welding electrode, bodily changes of a welding electrode or similar effects. These changes are similarly passed to the evaluation device 12 and can be used for servicing of the welding tongs, for determination of the replacement time of a corresponding welding electrode or for similar purposes.

The invention claimed is:

1. Method of open or closed-loop control of a welding tong movement by a welding tong drive, comprising at least one primary and one secondary drive device, wherein the primary drive device moves at least two welding tong limbs with welding electrodes from essentially opposite sides towards a welding object and presses the at least two welding tong limbs with a predetermined compressive force onto the welding object, and wherein the secondary drive device during its actuation varies a spatial orientation of the welding tongs, the method comprising the following steps:
   a) approach of the welding tongs to a predetermined spatial point relative to the welding object;
   b) holding of the welding tongs in a fixed spatial orientation during the approach;
   c) after the holding step and before an actuation step, and after termination of the approach towards the welding object, acquiring an applied holding current for the secondary drive device;
   d) actuation of the secondary drive device up to contacting of the welding object with at least one welding tong limb and acquisition of the contacting, wherein in the actuation step the holding current is varied by a predetermined contacting current level for the actuation of the secondary drive device for establishing contact, and
   e) after acquisition of the contacting, closure of the welding tong limbs by the primary drive device with build-up of a predetermined compressive force for welding.

2. Method according to claim 1, wherein in the approaching step the welding tongs are moved by a robot device and during actuation of the secondary drive device the welding tong limbs are in a fixed spacial relationship with respect to each other.

3. Method according to claim 1, wherein the contacting current level is determined experimentally for essentially each spatial point.

4. Method according to claim 1, wherein the contacting current level is selected to overcome friction forces occurring during the movement of the welding tongs.

5. Method according to claim 1, wherein the contacting current level is increased by a specified factor to achieve an initial breakaway torque for initiating the movement of the welding tongs by the secondary drive device.

6. Method according to claim 1, wherein the contacting current level is increased for at least one of a predetermined time and a predetermined movement displacement of the secondary drive device.

7. Method according to claim 1, wherein the welding force in the closure step is increased to about 5 kN.

8. Method according to claim 1, wherein the welding tong limbs are opened by the primary drive device before moving to a further welding point or after termination of welding and then the welding tongs are moved by the secondary drive device to a starting spatial point.

9. Method according to claim 1, wherein deviations from specified spatial points of the welding object or from corresponding welding points are acquired by an open or closed-loop control device of at least one of the secondary drive device and the primary drive device and are passed to an evaluation device for quality assurance.

10. Method according to claim 1, wherein bodily changes to the welding electrodes and to parts of the welding electrodes due to wear, degrading of material, loss of a welding electrode or parts thereof are acquired on contacting the welding object or contacting the welding tong limbs or the welding electrodes together by an open or closed-loop control device.

11. Method according to claim 1, wherein the secondary drive device is swivelled by at least two single drives of the welding tongs essentially within a hemisphere.

* * * * *